Figures 6, 7:
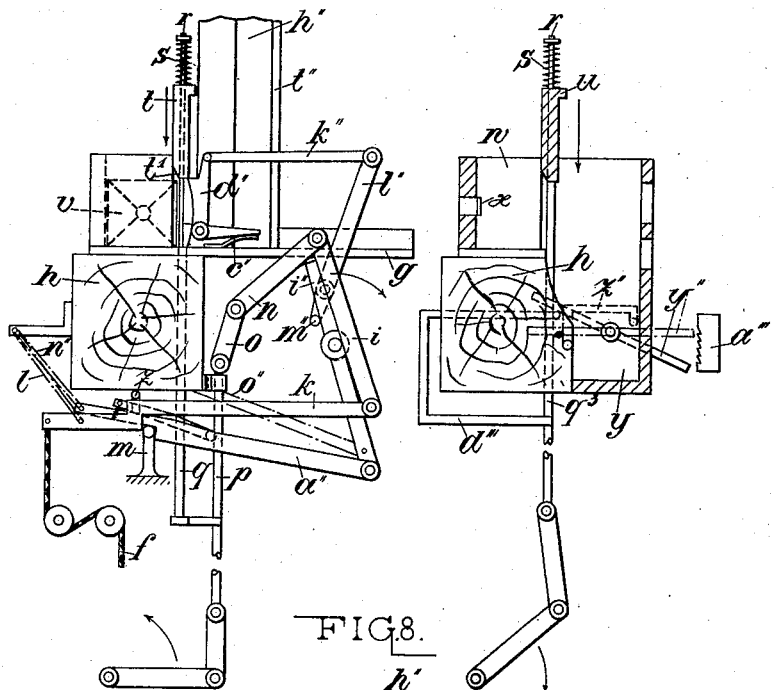

R. ZSCHWEIGERT.
WEFT REPLENISHING LOOM.
APPLICATION FILED OCT. 3, 1907.
933,813.
Patented Sept. 14, 1909.
6 SHEETS—SHEET 1.
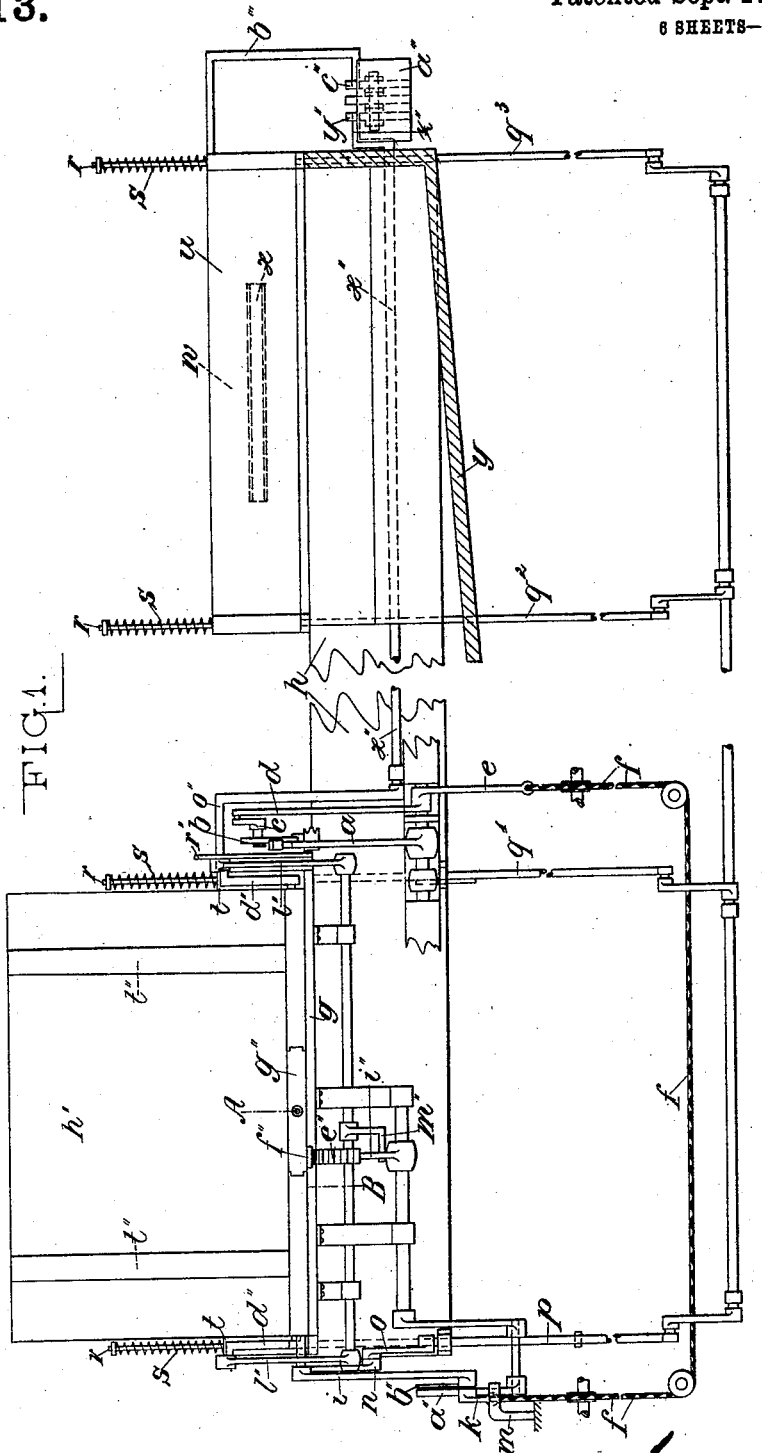

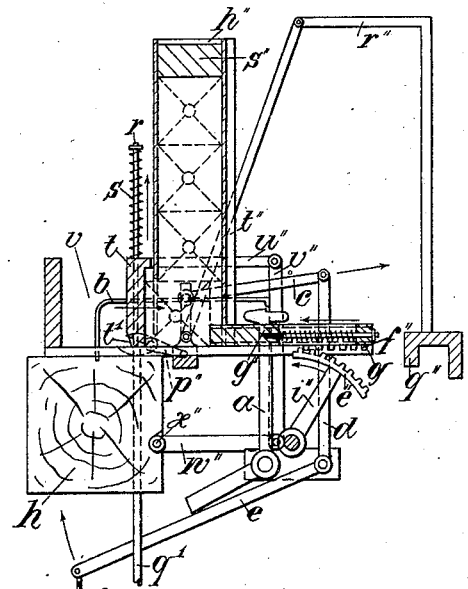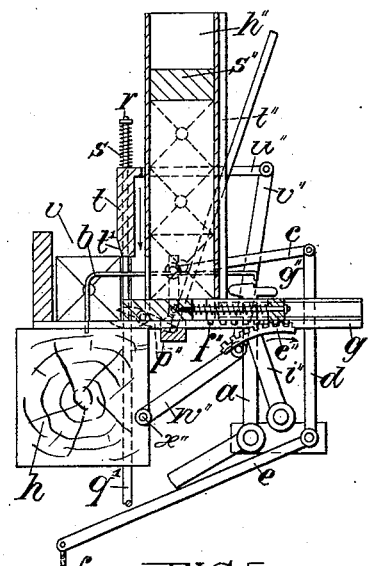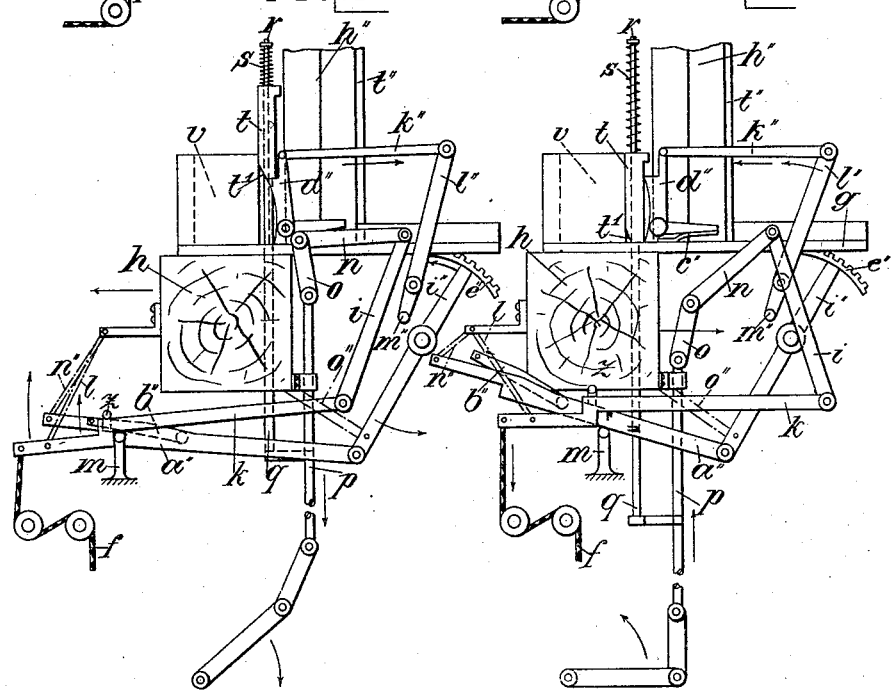

R. ZSCHWEIGERT.
WEFT REPLENISHING LOOM.
APPLICATION FILED OCT. 3, 1907.

933,813.

Patented Sept. 14, 1909.

6 SHEETS—SHEET 3.

R. ZSCHWEIGERT.
WEFT REPLENISHING LOOM.
APPLICATION FILED OCT. 3, 1907.
933,813.
Patented Sept. 14, 1909.
6 SHEETS—SHEET 4.
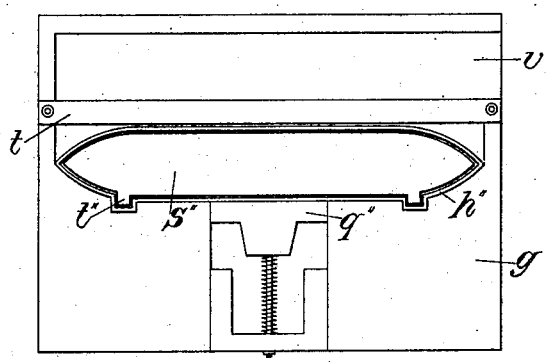
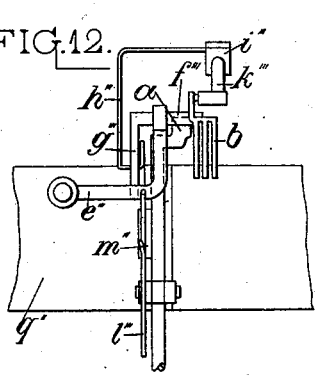
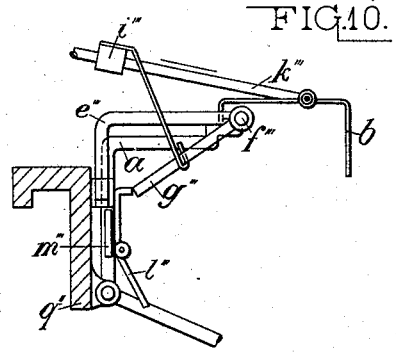
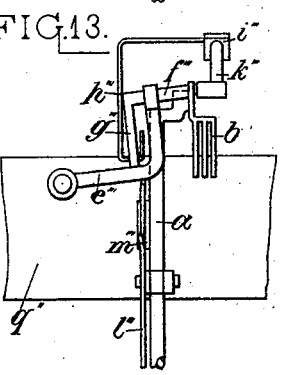
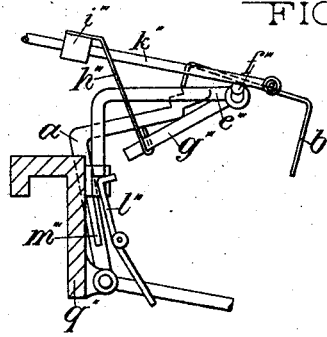

R. ZSCHWEIGERT.
WEFT REPLENISHING LOOM.
APPLICATION FILED OCT. 3, 1907.

933,813.

Patented Sept. 14, 1909.
6 SHEETS—SHEET 5.

R. ZSCHWEIGERT.
WEFT REPLENISHING LOOM.
APPLICATION FILED OCT. 3, 1907.
933,813.
Patented Sept. 14, 1909.
6 SHEETS—SHEET 6.
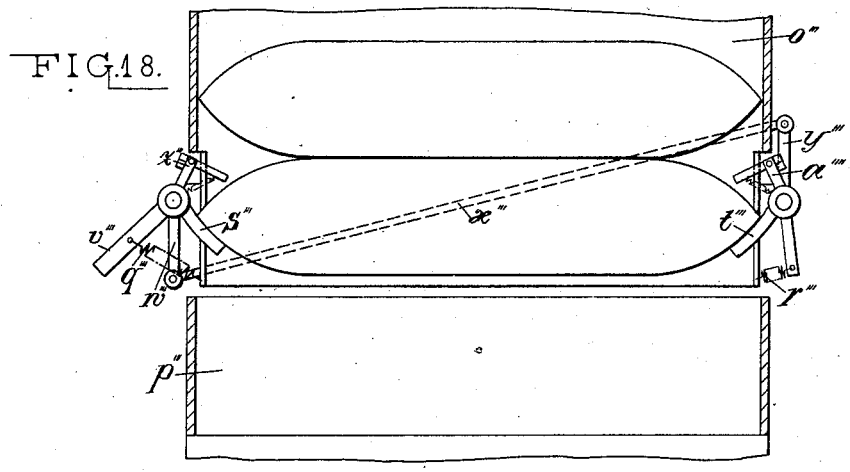
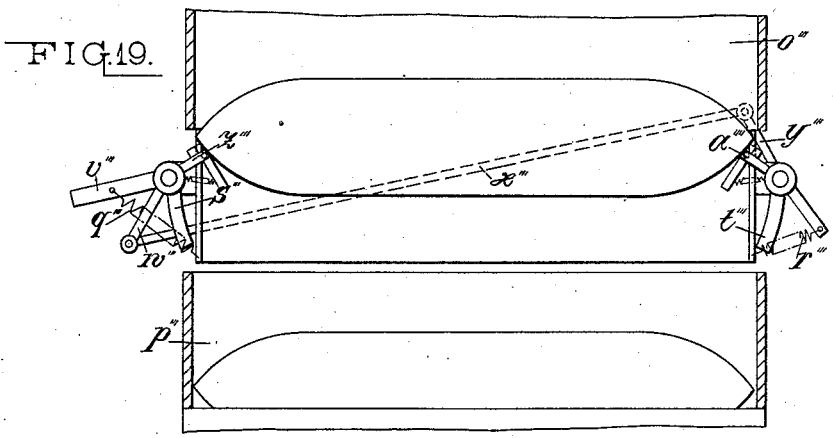
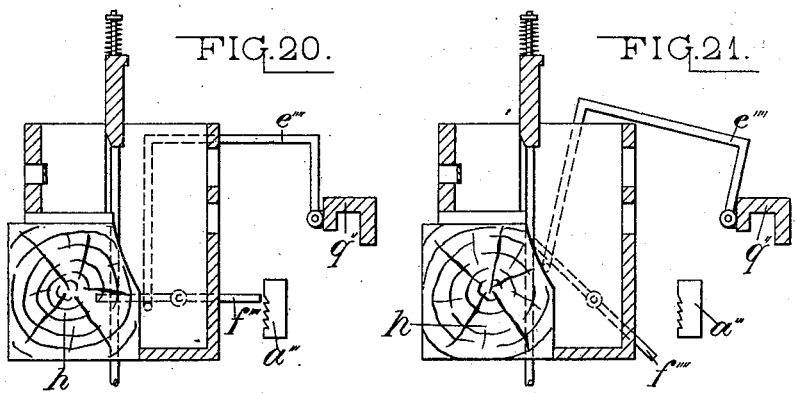

UNITED STATES PATENT OFFICE.

RUDOLF ZSCHWEIGERT, OF PLAUEN, GERMANY.

WEFT-REPLENISHING LOOM.

933,813.  Specification of Letters Patent.  Patented Sept. 14, 1909.

Application filed October 3, 1907. Serial No. 395,748.

*To all whom it may concern:*

Be it known that I, RUDOLF ZSCHWEIGERT, a subject of the Emperor of Germany, residing at Plauen, Kingdom of Saxony, Germany, have invented certain new and useful Improvements in Weft-Replenishing Looms, of which the following is a full, clear, and exact specification.

The ordinary weavers' looms are constructed in such a manner that when the weft-thread breaks, they must be stopped by means of the weft-hammer, and as a break of the weft-thread frequently occurs, considerable loss of time is caused by the frequent stopping of the loom, which is still increased if, as usual, one weaver attends several looms. Further loss of time is caused by the repeated new-insertion of the shuttle.

The invention described herein does not only dispense with the insertion of each single shuttle by the weaver but also makes it possible to insert a new shuttle and remove the exhausted shuttle without stopping the loom, a chamber being provided for receiving the removed shuttle. If the weft threads break, the weft-hammer, which is operated by an eccentric as usual, and which hammer is arranged on the side of the loom opposite to that on which same is driven, takes with it the weft-fork, which by means of a cord or the like connection pulls down the free end of a lifting wire, which is rotatably arranged on the lathe or batten. In the center of its movement the lifting wire engages with a blade arranged on the frame of the machine, which blade prevents it from traveling with the batten toward the breast-beam and causes it to operate a tie-rod pivoted to it, which tie-rod serves to operate two connecting rods arranged on the two shuttle-boxes. That longitudinal wall of each shuttle-box, which is turned toward the breast-beam can slide upward. Under ordinary circumstances this wall is held down by means of springs, as soon however, as the connecting rods are operated by the lifting-wire, said rods engaging underneath the movable walls, press them upward, and the shuttle, separated from the broken thread, is pressed through a spring-controlled flap arranged on the side of the shuttle-box opposite to that near the lifting-wire. The shuttle removed from the box is received by a case from which it slides in a groove to the other side of the loom (the side on which the loom is attended) where it remains in a chamber arranged on the bottom of the machine. During the movement of the lathe or batten from the dead point in front, to the breast-beam, the above mentioned lifting-wire has pressed down a second lifting-wire by means of a projection, which second lifting-wire engages now with the blade arranged on the frame. The first lifting-wire is disengaged from the blade and by means of spring power returns to its original position. This causes the connecting rods and with them the shuttle discharging walls of the shuttle-boxes to drop, while the walls on the opposite side of the latter are held in their high position by means of pawls, rotatably arranged on the lathe or batten. As soon as the latter reverses its travel, the second lifting-wire operates by means of a toothed segment and a rack, a slide of leather in such a manner that the same moves a fresh shuttle from a chamber, arranged in front of the shuttle-box, into the latter. When the slide has performed its action, the arm of the toothed segment meets and operates a pin connected to the pawls, thus releasing the latter from their engagement with the wall of the shuttle-box, which is returned to its lower position by means of its controlling springs. While moving downward the wall pushes the shuttle by means of a sloping part entirely into the box. In the meantime the batten has arrived at its dead point in the rear of the loom and the second lifting-wire is released and returns to its position of rest. After this the loom continues its work, the broken weft-thread having been cut off by means of scissors. As the cloth-edge must be kept back during the exchange of the shuttle a regulator may be provided in the known manner.

In order to automatically stop the loom when all shuttles have left the chamber in which they are stored, a plate is arranged in the said chamber, said plate having projections so as to extend beyond the shuttles, in such a manner that when the last shuttle has left, this plate is pushed in the shuttle-box and prevents the closing of the wall of same. This operates a stop-mechanism for automatically stopping the loom when one of the sliding walls of the shuttle-box is jammed.

In order to insure a reliable working of the arrangement it is necessary to provide a lever, arranged adjacent to the weft-hammer and operating the weft-fork, which lever serves to disengage the weft-hammer during the down and return travel of the batten, following a removal of a shuttle, so as to prevent the same from removing all the shuttles. This is effected by moving the weft-fork when returning, by means of the above mentioned lever, out of the range of the lifting-wire of the weft-hammer, in such a manner that during these two travels the weft-hammer will perform an oscillating movement, without, however, operating the warp-fork.

In order to prevent the shuttle-box walls from creating noise when dropping, pads of india rubber or the like may be interposed.

If a large storing-chamber is required it is advisable to arrange the same on the breast-beam and provide a small container capable of receiving one shuttle only, on the batten, said container corresponding exactly to the lower part of the storing chamber, which in the first mentioned case is arranged on the batten. During the travel of the batten the smaller container will at certain times come underneath the storing-chamber, which is provided with two grips or gripping devices which hold the lowest shuttle in position. As soon as a weft-thread breaks and the sliding walls of the shuttle-box are lifted in the manner described above, a sloping plate, operates the grips when the batten approaches the breast-beam in such a manner, that the lowest shuttle is released and drops into the container beneath from which it is moved into the shuttle-box by means of a slide. A lever engaging with a recess arranged in the container and connected to a disengaging arrangement serves to stop the loom when the store of shuttles is exhausted.

Figure 8:
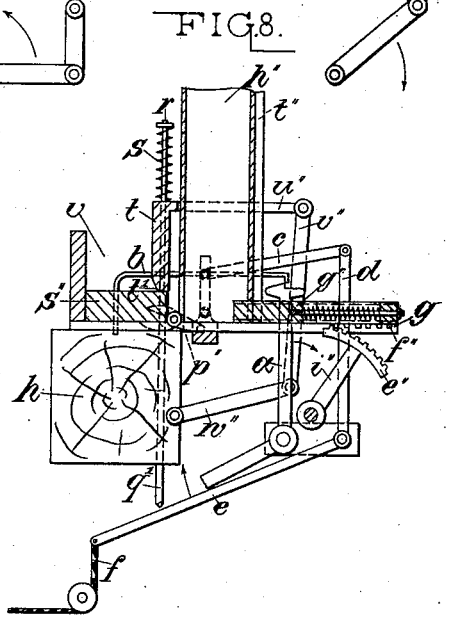
Figure 14:
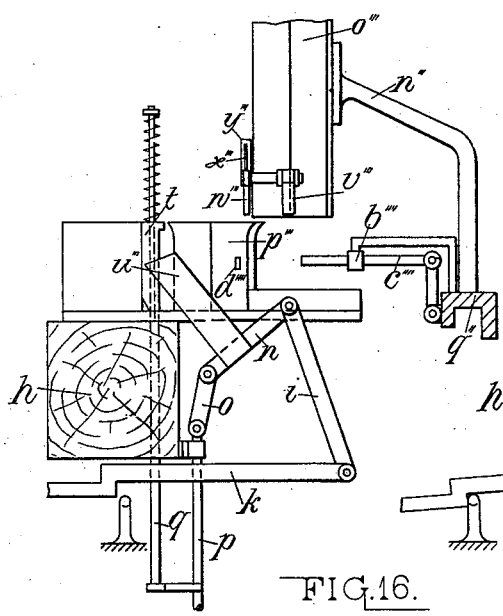
Figure 15:
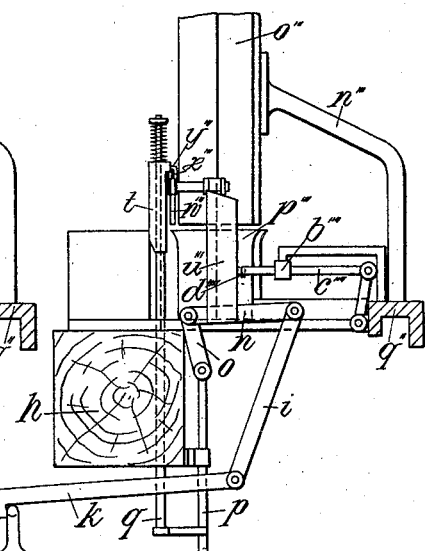
Figure 16:
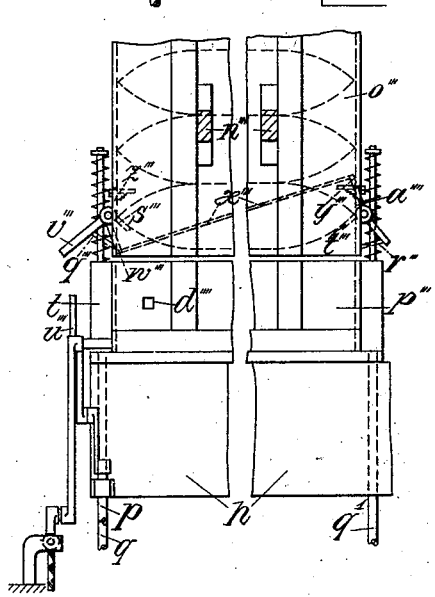
Figure 17:
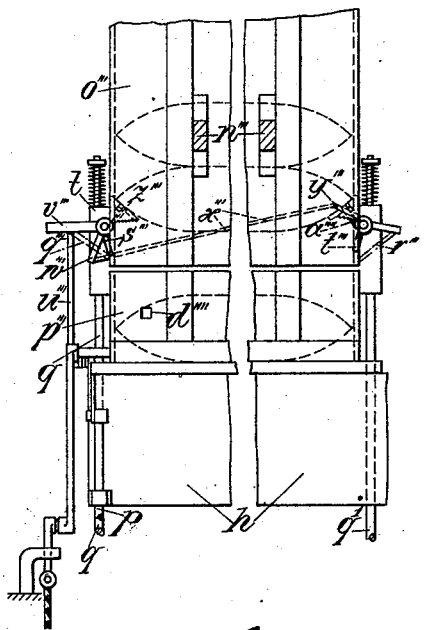

I will now describe my invention with reference to the accompanying drawings, in which my invention is shown by way of example, and in which:

Figure 1 shows a front view of the shuttle-boxes, partly in section. Figs. 2 and 3 show sections on line A—B of Fig. 1 in the positions of rest and working respectively. Figs. 4 to 6 show the insertion of the fresh shuttle at different stages of the action. Fig. 7 shows a section of the shuttle-box at its shuttle-discharging side. Fig. 8 shows a section on line A—B of Fig. 1 with the shuttle-box in the disengaged position, caused by the plate of the shuttle storing chamber after departure of the last shuttle. Fig. 9 is a view of the shuttle-box from the side on which the shuttle is inserted. Figs. 10 and 11 show two side views of the weft-fork and the arrangement operating it. Figs. 12 and 13 show front views of the same. Figs. 14 to 21 show a modification of the above arrangement, two shuttle-storing chambers being arranged, one of which is fixed to the breast-beam of these figures, Figs. 14 and 15 show side views of the arrangement of the storing-chamber, partly in section, in the positions of rest and working respectively. Figs. 16 and 17 show the corresponding front-views, the breast-beam being omitted. Figs. 18 and 19 show an enlarged view of the storing chamber. Figs. 20 and 21 show the disengaging arm in its position of action and in rest respectively.

As long as the weft-thread is not broken, the weft-hammer $a$, which is arranged on the frame of the loom and preferably so as to oscillate on the breast-beam, is disengaged from the weft-fork $b$. As soon however as the thread breaks, the weft-hammer $a$ takes the fork $b$ with it in the direction of the arrow (Fig. 2) whereby the fork by means of rods $c$, $d$, $e$ and cord $f$ pulls the free end of the lifting-wire $k$ down, which is connected to the plate $g$ of the lathe or batten $h$ by means of link $i$ and which is held in its raised position by spring 1. In the course of its movement the lifting-wire engages with a blade $m$ arranged on the frame of the machine and is thereby prevented from traveling down with the batten in the direction of the arrows in Figs. 5 and 6 at the subsequent movement of the latter, but is caused to lift a tie-rod $p$ connected with it by means of lever $n$ and link $o$. The tie-rod $p$ is rigidly connected with a bar $q$ on one side and by means of a shaft with bars $q^1$ $q^2$ $q^3$ on the other side, said bars $q$, $q^1$, $q^3$, $q^2$, pressing through the lathe or batten $h$ on the sides of the shuttle-boxes (Fig. 1) in such a manner that they engage from below with the vertically sliding walls $t$, $u$ of shuttle-boxes $v$, $w$ respectively, said walls being held in their lower and shut position by means of springs $s$ on rods $r$. It is evident that when operated by rod $p$ the bars $q$, $q^1$, $q^2$, $q^3$ will lift the walls $t$, $u$ so that the shuttle separated from the weft-thread will be thrown out of its box $w$ (Figs. 1 and 7) by means of a spring $x$, and will be conducted in a groove $y$ to the other side of the loom (where the weaver stands). The batten $h$ has arrived in the meantime at its dead point in front, and during this phase the lifter $k$ has pressed a second lifting-wire $a''$ down, by means of a projection $z$, said lifting-wire $a''$ being protected by a spring-controlled sliding lever $b''$ and engaging now with the blade $m$ (Fig. 4), while the lifter $k$ is released and returns to its original position by its spring power. This causes the bars $q$, $q^1$, $q^2$, $q^3$ to drop and allows the discharging wall $u$ of the shuttle-box to be closed under the action of the springs controlling same, while the wall $t$ is held in its high position (Fig. 4) by two pawls $d''$ impelled by springs $c''$ in the direction of the arrow (Fig. 5). As soon as the batten $h$ reverses its travel, the lifter $a''$ moves a slide $g''$ by means of a toothed arc or segment $e''$ and a rack $f''$, in such a manner that the same moves a fresh shuttle from a chamber $h''$ arranged in front of the shuttle-box $v$ into the latter (Figs. 3 and 6). As soon as the slide $g''$ has moved the fresh shuttle nearly into the box, the arm $i''$ of the toothed segment $e''$ meets a pin $m''$ mounted on the same shaft as levers $l''$ connected with two rotating pawls $d''$ by means of tie-rods $k''$, thus withdrawing the pawls, so that the wall $t$ of the shuttle-box drops and by means of a sloping part $t'$ pushes the shuttle right into the box. The shuttle then leaves the box under the action of the picker, which is provided with whip and counterwhip, and the released lifter $a''$ is pulled upward by spring $n''$. The toothed segment $e''$ and with it slide $g''$ are returned to their positions of rest by the spring $o''$ (Fig. 5). At the same time the scissors $p''$, the lower blade of which is fixed and the upper blade of which is moved up and down by a lever $r''$ arranged to breast-beam $q''$ according to the movement of the lathe, cut off the first thread coming from chamber $h''$ and not lying in the middle of the shuttle-box, while they do not affect the other threads as the same do not come within the range of the blades.

A plate $s''$ is placed in the chamber $h''$ in which the shuttles are stored, on top of the last shuttle, said plate having projections $t''$ which slide in corresponding grooves of the chamber. As soon as the last has left the loom, this plate $s''$ will be pushed in the shuttle-box $v$ by slide $g''$ and by means of its projections $t''$ will make a complete closing of wall $t$ impossible. The latter carries a bar $u'$ which by means of rods $v''$ and $w''$ moves the shaft $x''$ and lifts or lowers an arm $z''$ arranged above the disengaging arm $y''$. The position of arm $z''$ shown in Fig. 7 corresponds to the phase of the action shown in Fig. 8 in which the plate $s''$ is shown lying in the shuttle-box. The stopping arm $y''$ is then in a horizontal position and stops the loom when pressing against plate $a'''$ which is effected by means of arm $b'''$ and pin $c'''$, as soon as the wall $u$ drops entirely (Fig. 1). As the stop arms are impelled by springs to their horizontal position, or position of disengagement, of the loom, it is necessary to press those sides turned toward the plate $a'''$ downward, which is effected by arms $z''$ and $b'''$ at the dropping of the shuttle-box walls, and by a bracket $d'''$ arranged on rod $q^3$, at the lifting of the shuttle-box walls (Fig. 7).

An arrangement may also be provided for automatically stopping the loom when several shuttles lie in the upper part of the groove $y$, notches being arranged in the groove, through which notches a shuttle may press directly on the plate $a'''$. As the weft must be kept back during the shuttle-exchange a regulator is provided for this end. For the good working of the above arrangement it is also important to provide a lever arrangement, which, during the up and down travel of the batten, immediately following the removal of a shuttle, keeps the weft fork outside the range of the lifter, in order to prevent a shifting of all the shuttles. Adjacent to the weft-hammer $a$, a rectangularly bent lever $e'''$ is pivotally arranged on the breast beam $q'$, which lever $e'''$ embraces with its free end a pin $f'''$ projecting underneath the back of the fork $b$, also a rod $g'''$ engaging with a bracket $h'''$. The latter is fastened to the piece $i'''$ of the fork-carrier $k'''$, in such a manner, that, when in consequence of breaking of the weft-thread, the weft-fork $b$ moves backward, the carrier $k'''$ moves backward too and by means of its movement turns lever $e'''$ by means of rod $g'''$ in such a manner that pin $f'''$ lifts the back end of the fork, and thus moves same out of the range of the weft-hammer. At the same time spring $l'''$ engages underneath lever $e'''$ and keeps the latter in its raised position, till the hammer $a$ pushes it back by means of projection $m'''$. In the meantime a new thread has been substituted for the broken one, which latter keeps the weft fork out of engagement with the lifter of the hammer.

If a fixed storing chamber is required a case or chamber $o'''$ of any required size and open at the top and bottom is fastened to the breast-dam $q''$ by means of an arm $n'''$. The case or chamber $o'''$ is constructed in such a manner that when the batten $h$ is in immediate proximity to the breast-beam, the case will be exactly above a container $p'''$, the mouth of which is enlarged so as to facilitate the introduction of the shuttle. The shuttles lying in the chamber $o'''$ are all held in position under ordinary circumstances by two pivoted grips $s'''$ $t'''$, held upward by springs $q'''$, $r'''$, so that normally no shuttle can leave the chamber.

As soon as the weft-thread breaks and because of same, the levers $k$, $i$, $n$, $o$ in conjunction with rods $p$, $q$, $q'$ lift wall $t$, $u$, stopping plate $n'''$ arranged on lever $n$ presses against an arm $v'''$ connected with the grips $s'''$ operating the latter and by means of rods $w'''$, $x'''$, $y'''$, and move the grip $t'''$, so that the lowest shuttle is released and drops in the container $p'''$, the following shuttles being prevented from dropping by supports $z'''$ and $a'''$ rigidly connected to grips $s'''$ and $t'''$ (Figs. 17 and 19). When the batten reverses its travel, the springs $q'''$ and $r'''$ are set in operation, supports $z'''$ and $a''''$ are released and the said following shuttle drops on to the holders or grips $s'''$, $t'''$ (Figs. 16 and 18).

In case no shuttle drops into the container $p'''$ a stopping arrangement is set in operation for automatically stopping the loom. For this purpose a contact lever $c''''$ is arranged on the breast-beam $q''$ in such a manner that it can slide in a guide $b''''$ and engage with a slot $d''''$ of the container $p'''$. If a shuttle is contained in the latter, lever $c''''$ will be pressed back by same (Fig. 15) and by this back movement, by means of an arm $e''''$ operates a brake-lever $f''''$, which is put in a sloping position so as to prevent a stoppage of the loom (Fig. 21). If however, the container $p'''$ is empty the lever $c''''$ does not meet any resistance and therefore remains in its position, so that arm $e''''$ is not operated, and the brake-lever $f''''$ presses against plate $a'''$, which effects a stopping of the loom, as already described herein.

The back walls of the shuttle-boxes may be slidable, in longitudinal as well as in lateral direction, and other modifications may be made without thereby deviating from the principle of this invention.

Having now particularly described and ascertained the nature of my said invention and in what manner the same is to be performed I declare that what I claim is:—

1. Means for automatically removing the shuttle of a weaver's loom when the weft thread is broken, and replacing the exhausted shuttle by a new one, consisting of shuttle-boxes having vertical "dropping" walls with sloping edges and longitudinal walls mounted to slide toward the breast beam, bars for lifting said vertical walls against the action of springs in order that the shuttle may be stopped, grooved means for conducting said shuttle away, a slide for automatically inserting a fresh shuttle on the opposite side of the shuttle-box, a chamber for storing the shuttles, and means for removing the shuttle from the chamber in which the shuttles are stored, and inserting it into the shuttle box in position to be pushed into its right position in the interior of the box by the sloping edge of the dropping wall of the shuttle-box, substantially as described and shown.

2. Means for automatically removing the shuttle of a weaver's loom when the weft thread is broken, and replacing the exhausted shuttle by a new one, consisting of shuttle-boxes having vertical dropping walls with sloping edges and longitudinal walls mounted to slide toward the breast beam, bars for lifting said vertical walls against the action of springs in order that the shuttle may be stopped, grooved means for conducting said shuttle away, a slide for automatically inserting a fresh shuttle on the opposite side of the shuttle box, a chamber for storing the shuttles, and means for removing the shuttle and inserting it into the shuttle box in position to be pushed into its right position in the interior of the box by the sloping edge of the dropping wall of the shuttle-box, a toothed rack, a segment engaging the same to set said slide in action, a blade on the loom frame, a lifter engaging said blade, and a second lifter operated by the first named lifter.

3. Means for automatically removing the shuttle of a weaver's loom when the weft thread is broken, and replacing the exhausted shuttle by a new one, consisting of shuttle-boxes having vertical dropping walls with sloping edges and longitudinal walls mounted to slide toward the breast beam, bars for lifting said vertical walls against the action of springs in order that the shuttle may be stopped, grooved means for conducting said shuttle away, a slide for automatically inserting a fresh shuttle on the opposite side of the shuttle-box, a chamber for storing the shuttles, and means for removing the shuttle from the chamber in which the shuttles are stored, and inserting it into the shuttle-box in position to be pushed into its right position in the interior of the box by the sloping edge of the dropping wall of the shuttle-box, two grips, an operating arm, a breast beam, a batten, a shuttle storing chamber or case on the breast beam, a sloping plate, a container fixed to the batten an arm connected with the grips, a lever carrying said sloping plate and pressing against said arm, rods and means whereby when the batten approaches the breast beam, the container will be underneath the storing chamber and that as soon as the shuttle-box walls are lifted said sloping plate will operate said grips by means of said arm which grips hold the lowest shuttle in the storing chamber in position, so as to release the lowest shuttle and allow the same to be dropped into the container underneath, whereby only one shuttle will be dropped, and supports for the next following shuttle substantially as herein shown and described.

4. Means for automatically removing the shuttle of a weaver's loom when the weft thread is broken, and replacing the exhausted shuttle by a new one, consisting of shuttle-boxes having vertical dropping walls with sloping edges and longitudinal walls mounted to slide toward the breast beam, bars for lifting said vertical walls against the action of springs in order that the shuttle may be stopped, grooved means for conducting said shuttle away, a slide for automatically inserting a fresh shuttle on the opposite side of the shuttle box, a chamber for storing the shuttles, and means for removing the shuttle from the chamber in which the shuttles are stored, and inserting it into the shuttle-box in position to be pushed into its right position in the interior of the box by the sloping edge of the dropping wall of the shuttle-box, and scissors for cutting the first thread of the shuttle coming from the store-chamber, substantially as herein shown and described.

5. Means for automatically removing the shuttle of a weaver's loom when the weft thread is broken, and replacing the exhausted shuttle by a new one, consisting of shuttle-boxes having vertical dropping walls with sloping edges and longitudinal walls mounted to slide toward the breast beam, bars for lifting said vertical walls against the action of springs in order that the shuttle may be stopped, grooved means for conducting said shuttle away, a slide for automatically inserting a fresh shuttle on the opposite side of the shuttle-box, a chamber for storing the shuttles, and means for removing the shuttle from the chamber in which the shuttles are stored and inserting it into the shuttle-box in position to be pushed into its right position in the interior of the box by the sloping edge of the dropping wall of the shuttle-box, and means for automatically stopping the loom when the last shuttle has left said chamber, said means consisting of a plate provided with projections a stopping arm, a stopping plate, said first named plate preventing the wall on the shuttle introducing side of the shuttle-box from closing thereby operating said stopping arm and stopping plate substantially as herein shown and described.

6. Means for automatically removing the shuttle of a weaver's loom when the weft thread is broken, and replacing the exhausted shuttle by a new one, consisting of shuttle-boxes having vertical dropping walls with sloping edges and longitudinal walls mounted to slide toward the breast beam, bars for lifting said vertical walls against the action of springs in order that the shuttle may be stopped, grooved means for conducting said shuttle away, a slide for automatically inserting a fresh shuttle on the opposite side of the shuttle-box, a chamber for storing the shuttles, and means for removing the shuttle from the chamber in which the shuttles are stored and inserting it into the shuttle-box in position to be pushed into its right position in the interior of the box by the sloping edge of the dropping wall of the shuttle-box, and a stopping mechanism, consisting of a batten, a container having a slot, an arm, a brake lever, a contact lever arranged on the breast-beam and engaging with said slot in the container, said lever effecting automatically the disengagement of the loom by means of said arm and said brake lever when no shuttle is left in the container, substantially as herein shown and described.

7. Means for automatically removing the shuttle of a weaver's loom when the weft thread is broken, and replacing the exhausted shuttle by a new one, consisting of shuttle boxes having vertical dropping walls with sloping edges and longitudinal walls mounted to slide toward the breast-beam bars for lifting said vertical walls against the action of springs in order that the shuttle may be stopped, grooved means for conducting said shuttle away, a slide for automatically inserting a fresh shuttle on the opposite side of the shuttle-box, a chamber for storing the shuttles, and means for removing the shuttle from the chamber in which the shuttles are stored, and inserting it into the shuttle box in position to be pushed into its right position in the interior of the box by the sloping edge of the dropping wall of the shuttle box, a stopping arm, a bracket for operating the same when the wall of the shuttle discharging side of the shuttle box is jammed, and which stops the loom, substantially as described and shown.

8. Means for automatically removing the shuttle of a weaver's loom when the weft thread is broken, and replacing the exhausted shuttle by a new one, consisting of shuttle boxes having vertical dropping walls with sloping edges and longitudinal walls mounted to slide toward the breast beam, bars for lifting said vertical walls against the action of springs in order that the shuttle may be stopped, grooved means for conducting said shuttle away to slide for automatically inserting a fresh shuttle on the opposite side of the shuttle-box, a chamber for storing the shuttles and means for removing the shuttle from the chamber in which the shuttles are stored, and inserting it into the shuttle box in position to be pushed into its right position in the interior of the box by the sloping edge of the dropping wall of the shuttle box, the weft fork means for holding the weft fork during the up and down travel of the batten following the discharge of the shuttle, outside the range of a lifter of the weft-hammer, and a carrier consisting of a rectangular bent lever engaging with an arm which is lifted through a movement of the carrier of the weft-hammer and also with a pin engaging underneath the weft-fork, substantially as herein shown and described.

In testimony whereof I affix my signature.

RUDOLF ZSCHWEIGERT.

In the presence of—
D. ALPHAN,
CHARLES NEUER.